Aug. 13, 1935.  J. E. OSBUN ET AL  2,011,298

BLOWER

Filed May 18, 1932

Inventors: Justin E. Osbun
Ralph Pryne
by: [signature]
Attorney

Patented Aug. 13, 1935

2,011,298

UNITED STATES PATENT OFFICE 2,011,298

BLOWER

Justin E. Osbun and Ralph Pryne, Los Angeles, Calif.

Application May 18, 1932, Serial No. 612,036

1 Claim. (Cl. 230—134)

This invention relates to that type of blower in which the fan blades employed are so constructed that a maximum input of air is propelled substantially parallel with the axis of the fan and is diverted radially outwardly by the fan in an efficient and effective manner to create a maximum transverse output of air. The primary object of the invention is to positively propel a maximum current of air in the manner stated with a minimum of power. A further object is the production of a blower of the type stated which is readily applicable for the various uses for which air blowers are ordinarily employed. Among further objects are simplicity of construction and greater effectiveness in use.

Figure 1:
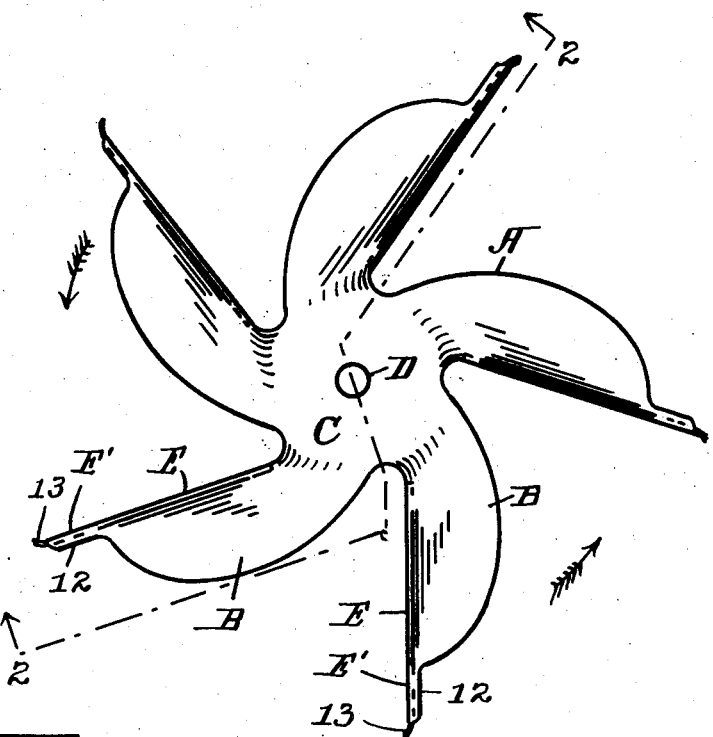
Figure 2:
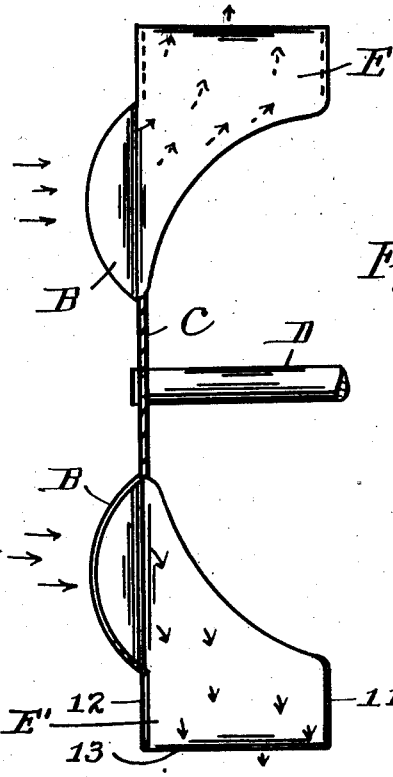
Figure 3:
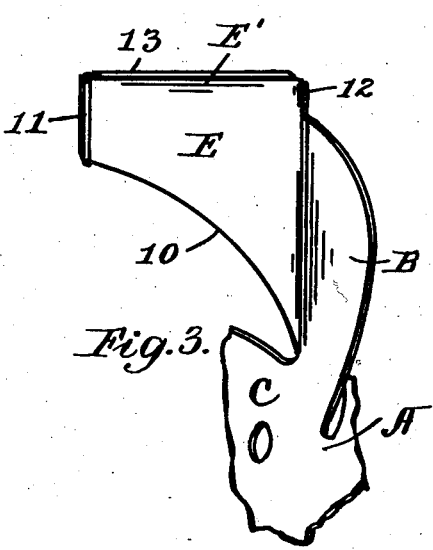

In the accompanying drawing forming part of this specification, Fig. 1 is a plan of our improved blower; Fig. 2 is a section taken on the line 2—2 of Fig. 1, and Fig. 3 is a perspective view of a fragment of our improved blower showing one of the propeller elements.

In the drawing, A indicates our improved blower, which is composed of a plurality of spiral air driving blade members B, radiating from a hub portion C, the latter being employed for mounting the blower on a revoluble element such as a shaft D or any other suitable rotatable member. These spiral blade members extend longitudinally in a rearward direction, that is in a direction substantially parallel with the axis and with the flow of air into the fan, so as to engage and force air into the vortex created by the fan. These spirals produce what is commonly termed a breeze fan.

The radiating outer end of each spiral blade gradually merges into a flat air driving blower blade member E of comparatively large surface area, lying in a plane parallel with the axis of the hub portion of the blower and is so disposed as to intercept the forward current of air which is positively driven by the spirals and divert the intercepted air centrifugally, thus creating an extensive lateral distribution of air. The blower blade members E constitute what is commonly termed a centrifugal blower. Each blower blade member E may if desired extend at E' radially beyond the tip of each spiral B and the total effective air driving face area of the flat blower blade is proportioned to the effective air driving face area of the companion spiral so that substantially all tendency for any air to lag behind the capacity of the blower blade member is overcome. Also by forming each spiral blade with what we have chosen to term a "leading edge" back of the hub and blower blades E more air is driven into the blower longitudinally, thereby overcoming any tendency for any air to lag behind the effective driving effort exerted by the blower blades.

The blower blades E may if desired be cut away along its inner edge at 10 sufficiently to remove all dead or ineffective air driving surface therefrom. The opposite side edges at 11 and 12 of the blower blades E may also if desired, be cupped forwardly to assist in preventing air from spilling off of the blower blade at its forward and rearward portions and the tip edge 13 of the blower blade may if desired be curved back to more readily release the air propelled by the blower blade centrifugally.

While we have chosen to illustrate the parts of our improved blower made out of a single piece of material, we contemplate that the blower can be made out of a number of separate parts assembled together to accomplish the improved results attained.

In accordance with the patent statutes, we have described the principles of operation of our invention, together with the apparatus which we now consider to represent the best embodiment thereof but we desire to have it understood that the construction shown is only illustrative and that the invention can be carried out by other means and applied to uses other than those above set forth within the scope of the following claim.

Having described our invention what we claim as new and desire to secure by Letters Patent is:

A fan consisting of a plate, constituting a hub lying in a plane substantially at right angles to its axis, said plate merging into a plurality of rearwardly extending radiating spiral blades, each blade having a spiral surface developed radially outwardly and adapted to impel air forwardly substantially parallel with the axis of the fan and thence divert it radially outwardly, each of said blades having a leading edge portion back of and gradually merging into the body of the blade adapted to assist in forcing air into the vortex of the fan, and having its radiating outer end gradually merging into a flat plate of large surface area lying substantially in a plane parallel to the longitudinal plane of the axis of the fan and adapted to force the air from the fan radially outwardly, and the radial tip of said flat plate being cupped back to more readily release the air centrifugally, and the opposite side edges of said flat plate being cupped to assist in preventing air from spilling off of said flat plate.

JUSTIN E. OSBUN.
RALPH PRYNE.